United States Patent Office.

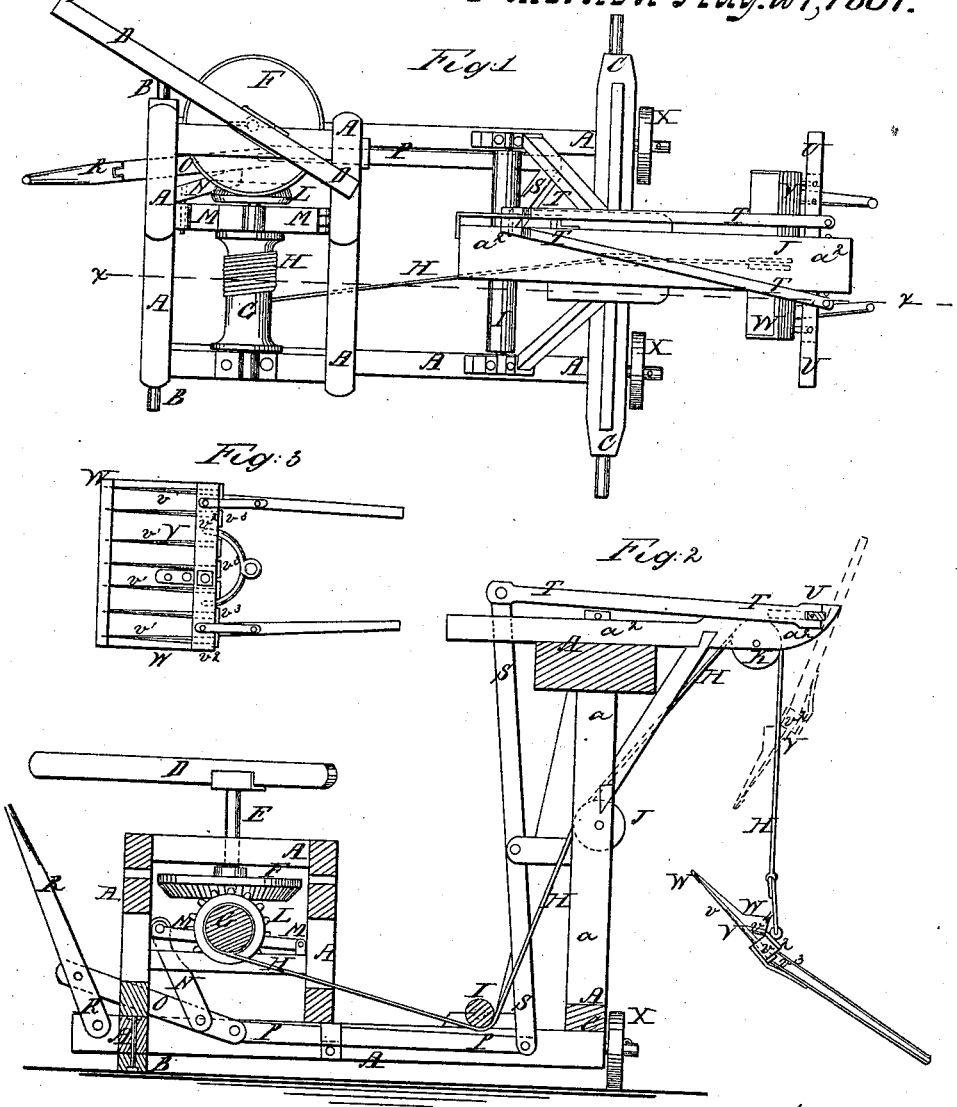

AMOS LEITNER, OF HOPEWELL TOWNSHIP, OHIO.

*Letters Patent No.* 68,216, *dated August* 27, 1867.

---

IMPROVEMENT IN PORTABLE CRANE FOR LOADING WAGONS.

---

The Schedule referred to in these Letters Patent and making part of the same.

---

TO ALL WHOM IT MAY CONCERN:

Be it known that I, AMOS LEITNER, of Hopewell township, in the county of Seneca, and State of Ohio, have invented a new and improved Portable Crane for Loading Wagons, &c.; and I do hereby declare that the following is a full, clear, and exact description thereof, which will enable others skilled in the art to make and use the same, reference being had to the accompanying drawings, forming part of this specification, in which—

Figure 1 is a top or plan view of my improved machine.

Figure 2 is a vertical longitudinal section of the same, taken through the line $x\ x$, fig. 1.

Figure 3 is a detail view of the combined fork and scoop.

Similar letters of reference indicate like parts.

My invention has for its object to furnish a convenient portable machine for loading wagons, &c.; and it consists in the combination of the lever-connecting bars and sliding-bar with each other and with the hinged bearing of the pinion-shaft, for the purpose of throwing the machine into and out of gear; in the combination of the lever-connecting bars and cross-bar with each other, with the sliding-bar, and with the slotted beam, for the purpose of throwing the machine out of gear; in the manner of attaching the tines to the fork-head; in the combination of the scoop with the fork, and in pivoting the machine to the ground by means of the forward axle and friction-wheels; the whole being constructed and arranged as hereinafter more fully described.

A is the frame of the machine, the forward end of which is pivoted to the forward axle B by a king-bolt, as shown in fig. 2, and the rear end of which is securely attached to the rear axle C. D is the sweep, by means of which power is applied to the machine. The sweep D is attached to the upper end of the vertical shaft E, revolving in bearings in the frame A, and having a bevel gear-wheel, F, attached to it, into the teeth of which mesh the pinions L attached to the end of the shaft or axle G, to which is attached and around which is wound the rope H for elevating the fork. From the shaft G the rope H passes around the roller I, pivoted to the frame A, over the pulley J, pivoted to the upright $a^1$, and over the pulley K, pivoted to the end of the arm or beam $a^2$, and to its end is attached the fork or other object to be raised. The end of the axle G, to which the pinion-wheel L is attached, revolves in bearings, M, one end of which is hinged to the frame A, and the other end pivoted to the end of the connecting-bar N, so that by raising and lowering the said bearing M the machine may be thrown into and out of gear. The lower end of the bar N is pivoted to the bar O, the lower end of which is pivoted to the slide-bar P, and the upper end to the lever R, the lower end of which is pivoted to the frame A, so that by operating the lever R the machine may be thrown into and out of gear. The slide-bar P slides back and forth in keepers attached to the frame A, and to its rear end is pivoted the lower end of the lever S which is pivoted to the frame A, and to the upper end of which is pivoted the ends of the connecting-bars T, the rear ends of which are connected to the cross-bar U upon opposite sides of the beam or arm $a^2$. The cross-bar U passes through and works in a slot formed in the end of the beam $a^2$. By this construction, as the handles of the fork V, after discharging its load come in contact with the cross-bar U, they force it back, ungearing the machine, and allowing the fork to descend, without its being necessary to back up the horse attached to the sweep D. V is the fork, the rear ends of the tines $v^1$ of which are passed through the cross-bar $v^2$, and secured in place by the nuts $v^3$. The tines $v^1$ are still further secured in place and strengthened by the braces $v^4$, the rear ends of which are secured to the upper side of the cross-bar $v^2$ by bolts or rivets passing through the said bar. W is the scoop, upon the under side of the forward edge of which is formed a groove into which the ends or points of the tines $v^1$ enter. The scoop W is further secured to the fork V by the arm $w'$ attached to the under side of said scoop, and the projecting end of which is bolted to the cross-bar $v^2$ of the fork V. By this construction the scoop W can easily be attached to or removed from the fork V when required. In using the machine, the wheels upon which it is drawn from place to place are removed, and the forward axle B pinned to the ground, the rear end of the machine resting upon the friction-wheels X. By this construction the rear end of the machine can be moved about as required.

What I claim as new, and desire to secure by Letters Patent, is—

1. The combination of the lever R, connecting-bars O and N, and sliding-bar P with each other and with the hinged bearing M of the pinion-shaft or axle G, substantially as herein shown and described, and for the purpose set forth.

2. The combination of the lever S, connecting-bars T, and cross-bar U with each other, with the sliding-bar P, and with the slotted end of the arm or beam $a^2$, substantially as herein shown and described, and for the purpose set forth.

3. Attaching the tines $v^1$ to the cross-bar $v^2$ of the fork-head, substantially in the manner herein shown and described.

4. The combination of the scoop W with the tines $v^1$ and cross-bar $v^2$ of the fork V, substantially in the manner herein shown and described, and for the purpose set forth.

AMOS LEITNER.

Witnesses:
    GEO. S. YINGLING,
    HENRY CROMWELL.